Patented June 27, 1950

2,512,723

UNITED STATES PATENT OFFICE 2,512,723

PLASTIC COMPOSITIONS CONTAINING POLYESTERS OF 2-ETHYLHEXANE-DIOL-1,3

William M. Lanham, Charleston, W. Va., assignor, by mesne assignments, to Union Carbide and Carbon Corporation, a corporation of New York No Drawing. Original application May 20, 1947, Serial No. 749,357. Divided and this application March 5, 1949, Serial No. 79,914

7 Claims. (Cl. 260—31.6)

1

This invention relates to plastic compositions containing plasticizers which are polyesters of 2-ethylhexanediol-1,3 with dibasic acids.

At present, the bulk of the plasticizer requirements for vinyl resins and cellulose derivatives is satisfied with relatively non-volatile esters of simple molecular structure, such as di(2-ethylhexyl) phthalate. While these simple esters possess considerable advantages for this purpose, the combination of resin and plasticizer is not as permanent as is desired, since gradual loss of plasticizer occurs by evaporation or by extraction with liquids which may come in contact with the plasticized resin. Furthermore, the simple ester plasticizers are active solvents for many substances, and they tend to migrate from the plasticized article to other materials which touch the plasticized article.

It has been found that liquid (i. e. capable of gravitational flow at 30° C.) polyesters of 2-ethylhexanediol-1,3 with saturated aliphatic dicarboxylic acids containing from four to ten carbon atoms, which polyesters have an average molecular weight of at least 500, and preferably from 1000 to 2000, are permanent plasticizers for vinyl resins and cellulose derivatives. The new polyesters are to be distinguished from the acetylated polyesters of ethylene glycol, diethylene glycol and triethylene glycol with succinic acid known in the art, in that the polyesters of 2-ethylhexanediol-1,3 are highly compatible with vinyl chloride resins, whereas the known polyesters derived from the simple glycols and polyglycols are quite incompatible with these resins.

The polyesters of 2-ethylhexanediol-1,3 and dibasic acids are preferably prepared by reacting an excess of the diol with the dibasic acid, that is, the molar ratio of diol to dibasic acid being greater than one so that the final products contain free hydroxyl groups. The average molecular weight of the polyesters may be controlled by regulating the molar ratio of the diol to the dibasic acid charged to the reaction vessel. Thus, the following data have been observed in the reaction of 2-ethylhexanediol-1,3 with succinic acid.

| Molar Ratio Diol to Acid | Average Molecular Weight Range of Polyester |
|---|---|
| 1.5 | 500–1,000 |
| 1.2 | 1,000–1,300 |
| 1.1 | 1,300–1,700 |

Products of higher molecular weight can be obtained by further reducing the ratio of diol to acid, for instance to 1.01.

Although it is not always essential, the free hydroxyl groups of the polyesters may be acylated with a fatty acid anhydride, such as acetic,

2 butyric or 2-ethylhexanoic anhydride. This treatment makes the polyesters more miscible with vinyl chloride resins and reduces any loss of plasticizer by water extraction from elasticized articles, such as shower curtains.

The chain length of the particular dibasic acid used in forming the polyesters influences the properties of the resulting plasticizer. Short-chain acids, such as succinic and adipic acids, result in plasticizers having good resistance to oil extraction but the plasticized articles tend to become somewhat inflexible at low temperatures. On the other hand, plasticized articles containing polyesters made from acids of longer chain length, such as sebacic acid, have better flexibility at low temperatures, although their resistance to extraction by oils is usually not as good. A compromise between low temperature flexibility and oil resistance of the plasticized articles can often be obtained by using mixtures of succinic acid and adipic acid or mixtures of succinic acid and sebacic acid.

The flexibility at low temperatures of articles plasticized with polyesters derived from succinic acid can be improved by substituting a polyethylene glycol, such as tri-, tetra-, penta-, or hexaethylene glycol, for part of the 2-ethylhexanediol-1,3. The molar ratio of the polyglycol to the diol should not exceed 1 to 5, because at higher ratios the polyesters become less compatible with vinyl chloride resins. As an exception, if adipic acid is used in making the polyesters, the molar ratio of the polyglycol to the diol may be higher than 1 to 5, for instance, 1 to 2.

The following compatibility data have been determined by examination of films cast from solutions of the resins and a fully acetylated polyester of succinic acid and 2-ethylhexanediol-1,3 having an average molecular weight of about 1300.

| Resin | Ratio of Resin to Polyester | | |
|---|---|---|---|
| | 9:1 | 4:1 | 1:1 |
| Cellulose nitrate, ½ Sec. R. S. | C | C | C |
| Methyl methacrylate resin | C | C | SI |
| Polyvinyl acetate | C | C | C |
| Polyvinyl chloride | C | C | C |
| Vinyl chloride, 87%; vinyl acetate, 13%; copolymer | C | C | C |
| Vinyl chloride, 90%; vinyl acetate, 10%; copolymer | C | C | C |
| Vinyl chloride, 97%; vinyl acetate, 3%; copolymer | C | C | C |
| Vinyl chloride, 87%; maleic acid, 1%; vinyl acetate, 12%; copolymer | C | C | C |
| Chlorinated rubber (low viscosity) | C | C | C |
| Cellulose acetate-butyrate | SI | SI | I |
| Cellulose acetate | I | I | I |
| Ethyl cellulose (low viscosity) | SI | I | I |
| Polystyrene | I | I | I |
| Polyvinyl butyral | SI | I | I |

C=compatible—clear film.
SI=slightly incompatible—hazy film.
I=incompatible—cloudy to cheesy film.

The polyesters are preferably made by heating 2-ethylhexanediol-1,3 with the diacid in the absence of a catalyst at a temperature of about 150° to 200° C. and in the presence of an agent forming an azeotrope with water to simplify removal of the water of reaction. Acid catalysts may be used to lower the reaction temperature. The acylation step, where selected, may be carried out by heating the polyester bearing hydroxyl groups with an excess of the fatty acid anhydride. After completion of the reaction, low boiling materials are stripped from the polyester by heating the product at reduced pressures.

The following examples will further illustrate the invention:

EXAMPLE 1

Two mols of succinic anhydride (200 grams), three mols of 2-ethylhexanediol-1,3 (438 grams), and 500 c.c. of benzene as the azeotrope former, were refluxed sixteen hours in a still with a decanter head. At the end of this time ten drops of concentrated sulfuric acid were added and refluxing continued for sixteen hours longer. During the whole esterification about 43 c.c. of water, which is slightly more than the theoretical amount, were collected. The benzene was flashed off under vacuum and the resulting residue was washed with water until neutral. After careful stripping of the residue in a falling film type stripping still, a yellow liquid was obtained having a molecular weight of 666 by the Menzies-Wright method. (J. Am. Chem. Soc. 43, 2314, 1921.) It was compatible with vinyl chloride (95%) vinyl acetate (5%) copolymer at 33% concentration of the polyester by weight of the composition, but after 41 days at room temperature some exudation of plasticizer was noticeable.

The free hydroxyl groups of this plasticizer were reacted with 2-ethylhexanoic anhydride by heating some of the plasticizer (144 grams) with an excess of 2-ethylhexanoic anhydride (134 grams) at 150° C. for 4.5 days. All low boiling materials were then stripped off in a falling film type stripping still to give a brown liquid product, molecular weight 912 by the Menzies-Wright method, which was compatible with vinyl chloride (95%) vinyl acetate (5%) copolymer at 33% concentration of the polyester by weight of the composition. The plasticizer did not exude on aging.

EXAMPLE 2

Nine mols of succinic anhydride (900 grams) and 10.8 mols of 2-ethyl-1,3-hexanediol (1577 grams) were heated together from 160° C. to 220° C. with a slow stream of nitrogen passing through the reaction mixture to carry off water as fast as formed. No catalyst was required at these temperatures and after about 24 hours of heating the water evolution had ceased. Further heating for eight hours at 220° C. and 10 mm. pressure followed by processing a falling film type stripping still gave a product, light yellow in color, with a molecular weight of 1227 by Menzies-Wright method. It was compatible with vinyl chloride (95%)-vinyl acetate (5%) copolymer at 33% concentration by weight of the polyester.

The free hydroxyl groups of the polyester were acetylated by heating 300 grams of the polyester with 500 grams of acetic anhydride for 16 hours on a steam bath. After this time acetic acid and excess acetic anhydride were removed at 100° C. and less than one mm. pressure. Final stripping was carried out in the falling film stripping still at 150° C. and less than one mm. pressure. The resulting plasticizer was a light yellow liquid compatible with vinyl chloride (95%)-vinyl acetate (5%) copolymer at 33% concentration.

2-ethylhexanoyl groups were also introduced in the molecule by heating 250 grams of the original polyester with 400 grams of 2-ethylhexanoic anhydride at 125° C. for 48 hours. All low boiling material was removed on the falling film stripper at 180° C. and less than one mm. pressure. This plasticizer also was compatible with the same vinyl copolymer at 33% concentration by weight of the polyester.

EXAMPLE 3

A general procedure useful for the preparation of 2-ethyl-1,3-hexanediol succinate acetate on a large scale is illustrated by the following example:

Apparatus

The apparatus used was a stainless steel still consisting of a kettle of 50 to 60 gallons capacity, a fractionating column, a short goose-neck column and a condenser. The liquid return line from the condenser at the top of the fractionating column was so arranged that the water removed from the reaction mixture with a refluxing inert solvent could be decanted. The apparatus was arranged so that the vapors from the still could pass through either the fractionating column or the goose-neck column, depending on which one was blocked-off.

Charge 175.7 lbs. of 2-ethylhexanediol-1,3 (1.2 pound mols)
118.1 lbs. of succinic acid (1.0 pound mol)
90.0 lbs. of dibutyl ether (azeotrope former)

Procedure

The goose-neck column attached to the kettle was blocked-off and the charge added to the kettle. The kettle temperature was slowly raised to 180° C. and maintained at this temperature. It was necessary to distill off some of the dibutyl ether while the temperature was being raised in order to avoid flooding the column. After a total time of approximately 36 hours, apparently no water was being formed and analysis indicated that the esterification was complete. The dibutyl ether was removed by distillation under reduced pressure and then 50.0 pounds of acetic anhydride were added to the kettle. The kettle temperature was maintained at 100 to 110° C. during this acetylation. Analysis of samples from the reaction mixture taken from time to time indicated that the acetylation was complete in somewhat less than eight hours.

The fractionating column was then blocked-off and the goose-neck column opened. The reaction mixture was then stripped at 180° C./5 mm. using this short column. When the acidity of the residue reached a value of less than 0.1 c.c. N KOH/g., the heating was stopped, the still vented, and the residue filtered while hot.

Properties

The final product was a thick liquid having a viscosity of 88,600 cp. at 20° C. and 2,239 cp. at 50° C. and an average molecular weight (Menzies-Wright) of 1285. The specific gravity was 1.080 and the refractive index $n_D^{30}$ was 1.4637.

When evaluated with a vinyl chloride (97%) vinyl acetate (3%) copolymer having an average molecular weight of about 24,000, it was found that the plasticizer was 46.4% effective, i. e. a concentration of 46.4% of the plasticizer based on the total weight of resin plus plasticizer produced an elastomer having an elongation of 100% at 25° C. under a load of 1000 p. s. i. (applied at a constant rate in 74 sec.). At this concentration the flex temperature (T$_F$) was −9° C. (The flex temperature is a measure of pliability and is defined as the temperature which yields an apparent modulus of elasticity of 135,000 p. s. i. according to Clash and Berg. (Ind. Eng. Chem. 34, 1218, 1942.) The tensile strength at the same concentration of plasticizer was 2200 p. s. i. and the ten day extraction loss from a 0.004″ film at 27° C. was 0.93% in water and 3.4% in mineral oil. There was no exudation of the plasticizer or aging at room temperature.

EXAMPLE 4

The plasticizer described in Example 3 was employed in making plastic compositions of different types by milling copolymers of vinyl chloride and vinyl acetate with the plasticizer and other ingredients. The polyester plasticizer did not migrate from the plasticized articles to other materials in contact with the articles and the polyester was not appreciably extracted by oil. In these respects, the new plasticized articles were superior to the commercial composition based on di(2-ethylhexyl) phthalate plasticizer.

A. *Injection molding composition (all percentages by weight)*

| | Per cent |
|---|---|
| Copolymer of vinyl chloride, 96%; vinyl acetate, 4% | 49.75 |
| Polyester plasticizer | 26.75 |
| Lead Silicate | 2.00 |
| Mineral oil | 1.50 |
| Calcium carbonate | 15.00 |
| Iron oxide, red | 2.00 |
| Carbon black | 0.50 |
| Brown pigment | 2.00 |
| Red pigment | 0.50 |
| | 100.00 |

B. *Extrusion composition (all percentages by weight)*

| | Per cent |
|---|---|
| Copolymer of vinyl chloride, 96%; vinyl acetate, 4% | 48.4 |
| Polyester plasticizer | 39.6 |
| Calcium stearate | 1.0 |
| Dibutyl tin laurate-maleate | 1.0 |
| Aluminum-hydrate | 10.0 |
| | 100.0 |

C. *Sheeting 12 mil, useful as a container for compass oil*

| | Per cent |
|---|---|
| Copolymer of vinyl chloride, 96%; vinyl acetate, 4% | 47.7 |
| Copolymer of vinyl chloride, 87%; vinyl acetate, 13% | 5.3 |
| Polyester plasticizer | 45.0 |
| Dibutyl tin laurate-maleate | 1.5 |
| Stearic acid | 0.5 |
| | 100.0 |

D. *Calendered film—4 mil—useful as a backing for pressure sensitive adhesive tape*

| | Per cent |
|---|---|
| Copolymer of vinyl chloride, 96%; vinyl acetate, 4% | 55.0 |
| Polyester plasticizer | 43.0 |
| Dibutyl tin laurate-maleate | 1.5 |
| Stearic acid | 0.5 |
| | 100.0 |

EXAMPLE 5

Three mols of adipic acid (438 grams), three and six-tenths mols of 2-ethylhexanediol-1,3 (526 grams), and 400 c. c. of xylene as the azeotrope former were heated together for about 18 hours after which time no further water was evolved and the acid number had reached a minimum value of about 10. The reaction mixture was then pot stripped to 180° C. at 1.5 mm. pressure. The resulting polyester was compatible at 45% concentration with vinyl copolymers of the type described in the previous examples.

In order to acetylate the free hydroxyl groups, 631 grams of the above polyester were heated for 48 hours at 100° C. with 230 grams of acetic anhydride. After pot stripping to 180° C. at 1 mm. pressure the residue was carefully stripped on the falling film stripper at 180° C. and 0.2 mm. pressure. The product was an amber colored liquid which milled readily with vinyl chloride-vinyl acetate copolymers at 45% plasticizer concentration.

EXAMPLE 6

A plasticizer similar to the acetylated polyester described in Example 5 was utilized in electrical insulation. The composition (% by weight) was as follows:

| | Per cent |
|---|---|
| Copolymer of vinyl chloride, 97%; vinyl acetate, 3% | 48.9 |
| Polyester of Example 5 | 40.1 |
| Lead silicate | 5.0 |
| Lead stearate | 1.0 |
| Clay | 5.0 |
| | 100.0 |

This composition had a volume resistivity at 50° C. of 3.7 x 10$^6$ megohm-cm. The resinous plasticizer, as compared to di(2-ethylhexyl) phthalate, is much more non-volatile, resulting in compositions which can withstand elevated temperatures for longer periods without stiffening.

EXAMPLE 7

A sebacate polyester corresponding to the adipate described in Example 5 was prepared by reacting 5 mols of sebacic acid (1011 grams) with 6 mols of 2-ethylhexanediol-1,3 (877 grams) under the same operating conditions. The unacetylated polyester was only partly compatible with vinyl chloride-vinyl acetate copolymer at 45% concentration since a clear sheet was not obtained.

Acetylation of hydroxyl groups was accomplished by heating 869 grams of the polyester with 160 grams of acetic anhydride at 100° C. for 24 hours. The product thus obtained was compatible at 45% concentration with vinyl chloride-vinyl acetate copolymer.

*Example 8*

A resinous plasticizer was prepared from two mols of 3,3'-thio-dipropionic acid (356 grams)

and two and four-tenths mols of 2-ethylhexanediol-1,3 (350 grams) with xylene as the azeotrope former for removing water. After heating the mixture for about 24 hours at 150 to 160° C. the reaction was complete. The product was carefully stripped in a pot still and in the falling film stripper at 180° C. and 0.5 mm. The polyester was acetylated by heating 515 grams of the polyester with 115 grams of acetic anhydride at 100° C. for 24 hours. The product was an amber colored liquid compatible with vinyl chloride-vinyl acetate copolymer at 50% concentration.

EXAMPLE 9

*Polyesters of 2-ethylhexanediol-1,3 with various dibasic acids and mixtures thereof*

The polyesters were all prepared in the presence of xylene as the azeotropic water removing agent, acetylated with acetic anhydride and then stripped of all low-boiling materials at the end of the reaction. The charging ratio of diol to dibasic acid and certain properties of the polyesters and of plastic composition comprising copolymers of vinyl chloride (96%), and vinyl acetate (4%) plasticized with the polyesters are given below, all percentages being by weight.

Of the foregoing examples, No. 9 demonstrates the effect of the chain length of the dibasic acid on the properties of the polyester and No. 10 illustrates the modifications obtainable by replacing part of the 2-ethylhexanediol-1,3 with another diol. However, the acetylated polyester of 2-ethylhexanediol-1,3 with succinic acid or anhydride has a favorable combination of properties, and can be made from cheap, readily available materials.

This application is a division of my copending application Serial No. 749,357, filed May 20, 1947, entitled "Polyesters of 2-ethylhexanediol-1,3."

What is claimed is:

1. A plastic composition comprising a copolymer of vinyl chloride and vinyl acetate plasticized with a composition comprising liquid polyesters of 2-ethylhexanediol-1,3 with aliphatic saturated dicarboxylic acids having from four to ten carbon atoms, said polyesters containing free hydroxyl groups and having an average molecular weight of from 500 to 2000.

2. A plastic composition comprising a copolymer of vinyl chloride and vinyl acetate plasticized with a composition comprising acetylated liquid esterification products of aliphatic saturated dicarboxylic acids having from four to ten

| | Plasticizer | | | Plastic Composition with Vinyl Copolymer | | | | |
|---|---|---|---|---|---|---|---|---|
| Mols Diol | Acid | Mols Acid | Viscosity, cp., 50° C. | Effectiveness, Per Cent [1] | $T_f$, °C. [1] | Tensile Strength, p.s.i. | Per Cent Extraction from .004" film 27° C. | |
| | | | | | | | In Water | In Oil |
| 1.1 | Succinic | 1.0 | 7,740 | 50.6 | −10.5 | 2,000 | 0.57 | 2.2 |
| 1.1 | ----do---- | 0.9 | | | | | | |
| | Adipic | 0.1 | 7,950 | 50.8 | −8 | 1,960 | 0.56 | 1.87 |
| 1.1 | Succinic | 0.8 | | | | | | |
| | Adipic | 0.2 | | 49.5 | −10 | 1,375 | 0.52 | 2.4 |
| 1.2 | Succinic | 0.5 | | | | | | |
| | Adipic | 0.5 | 1,491 | 45.7 | −11.3 | 1,740 | 0.27 | 1.37 |
| 1.1 | ----do---- | 1.0 | 2,597 | 46 | −10.5 | 2,040 | 0.22 | 0.83 |
| 1.2 | Succinic | 1.0 | 2,239 | 46.4 | −9 | 2,200 | 0.93 | 3.4 |
| 1.1 | ----do---- | 0.9 | | | | | | |
| | Sebacic | 0.1 | 5,975 | 47.6 | −8 | 1,500 | 0.31 | 2.14 |
| 1.2 | ----do---- | 1.0 | 783 | 41.5 | −25 | 2,120 | 0.80 | 19.8 |

[1] For definition see Example 3.

EXAMPLE 10

*Polyesters of mixtures of 2-ethylhexanediol-1,3 and glycols with dibasic acids*

The polyesters were all prepared in the presence of xylene as the azeotropic water removing agent, acetylated with acetic anhydride and then stripped of all low-boiling materials at the end of the reaction. The charging ratio of diol to dibasic acid and certain properties of the polyesters and of plastic composition comprising copolymers of vinyl chloride (96%), and vinyl acetate (4%) plasticized with the polyesters are given below, all percentages being by weight.

carbon atoms with more than one mol of 2-ethylhexanediol-1,3 per mol of acid, said esterification products before acetylation having an average molecular weight of at least 500.

3. A plastic composition comprising a copolymer of vinyl chloride and vinyl acetate plasticized with a composition comprising an acetylated liquid esterification product of succinic acid with more than one mol of 2-ethylhexanediol-1,3 per mol of acid, said esterification product before acetylation having an average molecular weight of at least 500.

4. A plastic composition comprising a copolymer of vinyl chloride and vinyl acetate plasti-

| Diols | Mols Diols | Mols Acid | Visc., cp., 50° C. | Effectiveness, Per Cent | $T_f$, °C. | Tensile Strength, p.s.i. | Per Cent Extraction from .004" film 25° C. | |
|---|---|---|---|---|---|---|---|---|
| | | | | | | | In Water | In Oil |
| 2-ethylhexanediol-1,3 | 1.0 | | | | | | | |
| 1,10-decane diol | 0.2 | [1] 1.0 | 1,574 | 45.5 | −9.5 | 2,150 | 0.28 | 2.5 |
| 2-ethylhexanediol-1,3 | 1.0 | | | | | | | |
| triethylene glycol | 0.2 | [1] 1.0 | 1,430 | 48.6 | −12.5 | 2,020 | 0.72 | 1.9 |
| 2-ethylhexanediol-1,3 | 1.0 | | | | | | | |
| tetra-ethylene glycol | 0.2 | [1] 1.0 | 1,074 | 47.8 | −14.5 | 2,080 | 2.51 | 6.0 |
| 2-ethylhexanediol-1,3 | 0.8 | | | | | | | |
| tri-ethylene glycol | 0.4 | [2] 1.0 | 590 | 42.0 | −16.7 | 2,420 | 2.03 | 4.8 |

[1] Succinic acid.
[2] Adipic acid.

cized with a composition comprising an acetylated liquid esterification product of adipic acid with more than one mol of 2-ethylhexanediol-1,3 per mol of acid, said esterification product before acetylation having an average molecular weight of at least 500.

5. A plastic composition comprising a vinyl chloride polymer plasticized with a softening agent comprising liquid polyesters of 2-ethylhexanediol-1,3 with aliphatic saturated dicarboxylic acids having from four to ten carbon atoms, said polyesters having an average molecular weight of at least 500.

6. A plastic composition comprising a vinyl chloride polymer plasticized with a softening agent comprising acylated liquid esterification products of aliphatic saturated dicarboxylic acids having from four to ten carbon atoms with more than one mol of 2-ethylhexanediol-1,3 per mol of acid, said esterification products before acylation having an average molecular weight of at least 500, and the acyl group in said acylated product being a fatty acyl radical containing from two to eight carbon atoms.

7. A plastic composition comprising a vinyl chloride polymer plasticized with a softening agent comprising an acetylated liquid esterification product of aliphatic saturated dicarboxylic acids having from four to ten carbon atoms with more than one mol of a diol mixture per mol of acids, said mixture consisting of 2-ethylhexanediol-1,3 and a liquid polyethylene glycol, the molar ratio of 2-ethylhexanediol-1,3 in said mixture being at least 5 to 1 and said esterification product before acetylation having an average molecular weight of at least 500.

WILLIAM M. LANHAM.

REFERENCES CITED

The following references are of record in the file of this patent:

UNITED STATES PATENTS

| Number | Name | Date |
| --- | --- | --- |
| 2,460,186 | Moffett | Jan. 25, 1949 |

OTHER REFERENCES

Ser. No. 404,514, Manchen (A. P. C.), published Apr. 20, 1943.